United States Patent [19]

Schneider et al.

[11] 4,389,213

[45] Jun. 21, 1983

[54] USE OF ESTERIFIED OXALKYLATES AS FORMULATION AGENTS FOR DYESTUFFS AND CORRESPONDING DYESTUFF PREPARATIONS

[75] Inventors: Manfred Schneider, Eppstein; Hubert Kruse, Kelkheim; Konrad Opitz, Liederbach, all of Fed. Rep. of Germany

[73] Assignee: Hoechst Aktiengesellschaft, Frankfurt am Main, Fed. Rep. of Germany

[21] Appl. No.: 371,231

[22] Filed: Apr. 23, 1982

[30] Foreign Application Priority Data

Apr. 27, 1981 [DE] Fed. Rep. of Germany ....... 3116581

[51] Int. Cl.³ ..................... C09B 67/46; D06P 67/02
[52] U.S. Cl. ........................................ 8/524; 8/527; 8/580; 8/582; 8/650; 8/662
[58] Field of Search ................... 8/524, 527, 580, 582

[56] References Cited

U.S. PATENT DOCUMENTS 4,286,960 9/1981 Schneider et al. ................ 8/527
4,333,732 6/1982 Deubel et al. .................... 8/527
4,336,025 6/1982 Schneider et al. ................ 8/527

*Primary Examiner*—A. Lionel Clingman
*Attorney, Agent, or Firm*—Curtis, Morris & Safford

[57] ABSTRACT

The invention relates to the use of water-soluble compounds obtained by esterifying alkylene oxide adducts on alcohols having 10 to 24 C atoms with carboxylic acids having up to 22 C atoms and carrying 1 to 6 carboxyl groups as preparation agents for dyestuffs which are insoluble to sparingly soluble in water and preparations which contain a dyestuff having a particle size of less than about 5 μm and one of the preparation agents mentioned.

10 Claims, No Drawings

USE OF ESTERIFIED OXALKYLATES AS FORMULATION AGENTS FOR DYESTUFFS AND CORRESPONDING DYESTUFF PREPARATIONS

The invention relates to the use of water-soluble compounds of the formula I

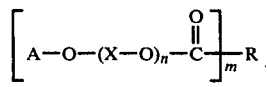

in which A represents an aliphatic radical having 10 to 24 C atoms, X represents identical or different groups of the formula $-CH_2-CH_2-$ and $-CH_2-CH(CH_3)-$, R represents the radical of a carboxylic acid $R(COOH)_m$ having up to 22 C atoms, m is a number from 1 to 6 and n denotes identical or different numbers from 8 to 100, as preparation agents for dyestuffs. It is preferable to use compounds of the formula I in which A denotes an aliphatic radical having 10 to 24 C atoms and R denotes the radical of an alkanecarboxylic or alkenecarboxylic acid and the proportion by weight of the oxyalkyl groups, which preferably are oxyethyl groups, in the overall molecule is 75 to 96%, in particular 80 to 94%, and the total molecular weight is 1,000 to 10,000, in particular 2,500 to 5,000.

Compounds of the formula I to be used according to the invention can be prepared, if desired after the addition of a catalyst, by esterifying alkylene oxide adducts with the corresponding acid(s).

These compounds of the formula I are highly suitable for use as formulation agents for dyestuffs which are insoluble to sparingly soluble in water, in particular vat dyestuffs and disperse dyestuffs, and permit the making of highly concentrated, liquid and powder preparations which have a low content of dispersing agent and have a large number of advantageous properties.

The invention therefore also relates to preparations which comprise a finely divided dyestuff, the particle size of which generally is below 5 μm, advantageously below 3 μm, and a compound of the formula I.

Previously known preparations of disperse dyestuffs have a series of disadvantages which dyestuff preparations according to the invention do not have. Thus, conventional preparations of disperse dyestuffs which exclusively contain anionic dispersing agents cause an undesirable drop in the viscosity when stirring printing pastes with synthetic thickeners. In the normal case, as the content of dispersing agent in the milling or kneading paste increases, the viscosity of the preparation also increases considerably, with the result that in unfavorable cases, above all at somewhat elevated temperatures, the preparations become viscous or even solid. On the other hand, the proportion of anionic dispersing agent cannot be reduced arbitrarily, since otherwise dispersions are frequently obtained which are unstable or from the start insufficiently finely dispersed.

In dye houses, for rationalization reasons, there is a trend toward increasingly shorter liquor ratios of dyebaths, for which dyestuff preparations which are as concentrated as possible are preferred. The high proportions of anionic dispersing agents in conventional disperse dyestuff preparations can lead to undesirable foam formation in modern dyeing processes, such as in jet-dying. Frequently, there are also complaints about a high dyestuff retention capacity, above all in pad-dyeing. In printing words, the high proportion of dispersing agent is customary disperse dyestuff preparations has the already-mentioned unfavorable influence on the viscosity of printing pastes and also makes necessary expensive post-washing of prints.

The invention now makes it possible to prepare dyestuff formulations which are not subject to the limitations mentioned and are particularly suitable for a series of special tasks. Thus, aqueous dyestuff dispersions according to the invention can be dried to give powders without suffering a loss of quality. Not only the powder preparations but also the liquid preparations are highly suitable for dyeing and printing a wide variety of materials.

In the text which follows, further preferred embodiments of the invention are illustrated in greater detail, percentage data being percentage data by weight unless otherwise indicated.

Compounds of the formula I preferably are esterification products of alcohols A-OH which have been reacted with ethylene oxide and/or propylene oxide and have 10 to 24 C atoms and aliphatic, cycloaliphatic or aromatic carboxylic acids $R(COOH)_m$ having up to 22 C atoms, in particular $C_1$- to $C_4$-alkane- or alkene-carboxylic acids with m denoting 1 or 2. The proportion of ethylene oxide and/or propylene oxide in the alkylene oxide adducts is so chosen that the final product is readily soluble in water. Examples of alcohols which have 10 to 24 C atoms and on which preferred compounds of the formula I are based are lauryl, myristyl, cetyl, stearyl and oleyl alcohols, alcohols from the oxo synthesis and also mixtures thereof.

Preferred preparations contain 5 to 90%, in particular 10 to 80%, of dyestuff, 2 to 30% in particular 2 to 15%, of the compound of the formula I, up to 20%, in particular up to 10%, of anionic dispersing agents and up to 70% of water and/or humectants. In addition, the preparations according to the invention can contain auxiliaries customary in such preparations, for example hygroscopic agents, anti-foam agents, dedusting agents or preservatives. If these preparations contain auxiliaries customary in such preparations, these auxiliaries can be added before, during or after the dispersing of the dyestuffs.

If the preparations according to the invention contain anionic dispersing agents, dispersing agents customarily used are employed for this purpose. Condensation products of aromatic sulfonic acids and formaldehyde, in particular condensation products of alkylnaphthalenesulfonic acids, above all methylnaphthalenesulfonic acids, and formaldehyde, as are known from U.S. Pat. No. 4,214,872, are preferable. Also suitable are condensation products of optionally substituted phenol with formaldehyde and sodium hydrogen sulfite as well as alkali metal salts of lignosulfonic acids.

By comparison to customary dyestuff preparations, the preparations according to the invention are distinguished by a very low content of surface-active substances.

Despite the low content of surface-active substances, in particular of anionic dispersing agents, preparations according to the invention are obtained which as liquid preparations with a very high dyestuff content have good flow and a high fastness to storing.

Owing to the good compatibility with synthetic thickeners, the preparations can be employed in printing inks in roller printing using very "shallow" engravings and produce intensely colored prints. The use in rotary screen printing is also possible.

The preparations according to the invention can be prepared by any known process. To prepare preparations of water-insoluble dyestuffs, the dyestuff or a mixture of dyestuffs is mixed with one or more of the mentioned compounds of the formula I, if appropriate with an anionic dispersing agent as well as, if appropriate, with other additives, and the mixture is subjected to mechanical comminution. In this process step, the sequence in which the components are added can also be changed. The mechanical comminution is preferably effected in dispersers such as kneaders, ball mills, bead mills, sand mills or attritors. That the desired state of fine division of a particle size of in general <about 5 $\mu$m, preferably <about 3 $\mu$m, has been obtained can be determined by means of a filter paper test or by means of a microscope. Preparations thus obtained contain the dystuffs in a stable, finely divided form.

The state of fine division is retained even on several weeks' storage, not only at room temperature but also at 5° C. and is not even impaired by the influence of cold.

To prepare a pulverulent preparation, aqueous preparations can be dried in a customary manner, for example by means of spray-drying. Pulverulent preparations thus obtained are readily redispersed by simply stirring them into water or into binder solutions.

Owing to the low content of surface-active substances, in particular of anionic dispersing agents, there is no retarding effect when using these dyestuff preparations according to the invention in dyebaths or in printing pastes, and brilliant shades are obtained. Furthermore, in direct printing the necessary postwashing can be considerably shortened or can even be dispensed with completely when using thickened pastes with a low content of solids without a noticeable deterioration in handle of the printed goods arising or brilliance and hue being impaired. In this case, the pH of the preparations is advantageously adjusted to a value of about 6 to 8.

In a particularly preferred embodiment of the invention, dyestuffs are employed which sublime to an extent of at least 60% without decomposition at between 150° and 220° C. under atmospheric pressure, in particular disperse dyestuffs from the series of the monoazo, disazo, anthraquinone, quinophthalone, nitro, azomethine, naphthalenetetracarboxylic acid or benzoxanthene dyestuffs or mixtures of such dyestuffs. The resulting preparations are suitable for the preparation of printing inks for the printing of transfer papers for heat-transfer printing.

In the examples which follow, percentage data and parts are percentage data and parts by weight, unless otherwise indicated.

EXAMPLE 1

300 parts of the dyestuff of the formula

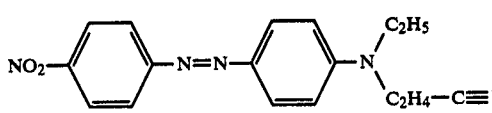
(1)

were milled, in a bead mill filled with Siliquarzit glass beads, in a solution of 50 parts of the acetic acid ester of an ethoxylated C$_{16}$/C$_{18}$-alcohol mixture (a mixture composed of approximately equal parts of cetyl alcohol and stearyl alcohol) having a mean molecular weight of 3,800 and an ethylene oxide content of 92% (termed "nonionic dispersing agent I" in the text which follows) and 25 parts of the dispersing agent known from Example D of U.S. Pat. No. 4,214,872 ("anionic dispersing agent A" in the text which follows), 100 parts of ethylene glycol, 2 parts of chloroacetamide as preservative and 350 parts of water. After 3 hours a dispersion was obtained, approximately 90% of the particles of which were smaller than 3 $\mu$m. The paste preparation was made up with water to 1,000 parts and filtered off from the beads.

The resulting dispersion which contained 30% of dyestuff was highly liquid and was fast to storing for several months at room temperature and at 50° C. It was highly suitable for dyeing wound packages. On stirring the dispersion into a thickened aqueous polyacrylate printing paste the viscosity changed only slightly, so that printing by means of shallow engravings was possible. Compared to printing by means of conventional dyestuff preparations using natural thickeners, it was possible to shorten the post-washing considerably or to dispense with it completely.

EXAMPLE 2

380 parts of the dyestuff of the formula

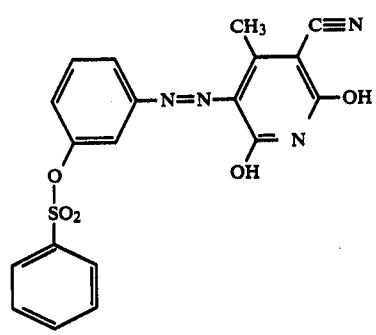
(2)

were milled for 4 hours, in a bead mill filled with Siliquarzit glass beads, in a solution of 60 parts of the acetic acid ester of an ethoxylated oleyl alcohol having a mean molecular weight of 1,100 and an ethylene oxide content of 80% (termed "nonionic dispersing agent II" in the text which follows), 120 parts of ethylene glycol, 2 parts of chloroacetamide as preservative and 300 parts of water. After these four hours, a dispersion was obtained which had good flow and over 90% of the particles of which were smaller than 3 $\mu$m. The paste preparation was made up to 1,000 parts with water and filtered off from the beads. The resulting preparation containing 38% of dyestuff was fast to storing for several months at room temperature and at 50° C. and had the good application properties mentioned in Example 1.

EXAMPLES 3 TO 12

If the dyestuffs and dispersing agents mentioned in the tables below were used instead of the components mentioned in Example 2 and the procedure followed was in other respects analogous to Example 2, likewise free-flowing paste preparations resulted which showed a high fastness to storing.

(a) Dyestuffs

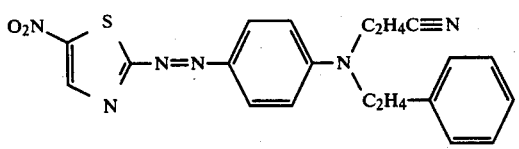
(3)

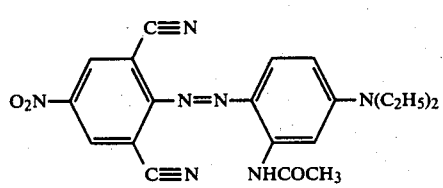
(4)

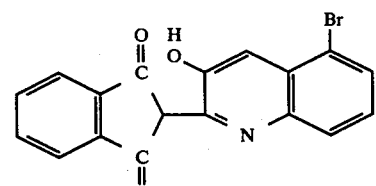
(5)

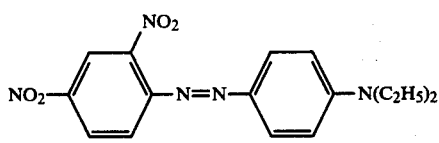
(6)

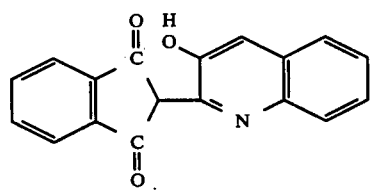
(7)

(b) Nonionic dispersing agents

III Succinate of an ethoxylated stearyl alcohol, ethylene oxide content of 85%, molecular weight of 2,600

IV Oleate of an ethoxylated C$_{16}$/C$_{18}$-alcohol mixture, ethylene oxide content of 86.5%, molecular weight of 4,050

V Acetate of an ethoxylated C$_{16}$/C$_{18}$-alcohol mixture, ethylene oxide content of 94%, molecular weight of 3,750

VI Acetate of an ethoxylated C$_{16}$/C$_{18}$-alcohol mixture, ethylene oxide content of 89%, molecular weight of 2,500

(c) Anionic dispersing agents

Dispersing agent B: Sulfosuccinic acid semi-ester of an ethoxylated condensation product of nonylphenol and formaldehyde (Example B of U.S. Pat. No. 3,775,056).

Dispersing agent C: Sodium salt of a ligninsulfonic acid.

Dispersing agent D: Condensation product of cresol, the sodium salt of 2-hydroxynaphthalene-6-sulfonic acid ("Schäffer's salt"), formaldehyde and sodium hydrogen sulfite

| Example | Dyestuff | | Nonionic dispersing agent | | Anionic dispersing agent | | Ethylene glycol | Milling period |
|---|---|---|---|---|---|---|---|---|
| | Type | Parts | Type | Parts | Type | Parts | Parts | (hours) |
| 3 | 3 | 320 | V | 80 | C | 30 | 80 | 7 |
| 4 | 3 | 320 | IV | 80 | C | 30 | 100 | 6 |
| 5 | 4 | 400 | V | 40 | B | 20 | 200 | 6 |
| 6 | 4 | 400 | II | 40 | B | 20 | 200 | 6 |
| 7 | 5 | 370 | III | 50 | A | 25 | 100 | 4 |
| 8 | 6 | 400 | III | 50 | A | 25 | 120 | 4 |
| 9 | 6 | 350 | V | 50 | A | 20 | 100 | 3 |
| 10 | 1 | 360 | IV | 60 | B | 20 | 200 | 4 |
| 11 | 2 | 400 | II | 60 | C | 30 | 150 | 5 |
| 12 | 7 | 400 | I | 80 | C | 20 | 100 | 5 |

EXAMPLE 13

313 parts of a moist press cake of the dyestuff of the formula (2) having a solids content of 32% were bead-milled with 100 parts of an aqueous solution containing 20 parts of the nonionic dispersing agent VI and 13.3 parts of the anionic dispersing agent A. After a milling period of 5 hours, a state of very fine division of the dyestuff was obtained. The milling paste was separated from the beads and spray-dried via a spray-drier with an inlet temperature of 160° to 180° C. and an outlet temperature of 70° to 80° C. A free-flowing powder was obtained which contained 75% of dyestuff and which could readily be dispersed by stirring in a thickened printing paste, an aqueous dyebath or a pad liquor.

EXAMPLE 14

417 parts of a moist press cake of the dyestuff of the formula (5) having a solids content of 24% were bead-milled with 75 parts of an aqueos solution containing 20 parts of the nonionic dispersing agent V and 10 parts of the dispersing agent D. After a milling period of 4 hours, a further 5 parts of the dispersing agent D were added to the dispersion and milling was continued for a further 30 minutes. The milling paste was separated from the beads and spray-dried as in Example 13. The result was a powder having a solids content of 70% and the advantageous properties mentioned in Example 13.

We claim:

1. A method of using a water-soluble compound of the formula I

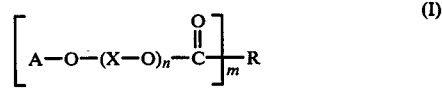
(I)

in which A represents an aliphatic radical having 10 to 24 C atoms, X represents identical or different groups of the formula —CH$_2$—CH$_2$— and —CH$_2$—CH(CH$_3$)—, R represents radicals of a carboxylic acid R(COOH)$_m$ having up to 22 C atoms, m is 1 or 2 and n denotes identical or different numbers from 8 to 100, as a preparation agent for dyestuffs.

2. The method of using compounds of the formula I, as claimed in claim 1, in which X represents —CH$_2$—CH$_2$—.

3. The method of using compounds of the formula I, as claimed in claims 1 or 2, in which A denotes an alkyl radical having 12 to 18 C atoms and R denotes the radical of an alkanecarboxylic or alkenecarboxylic acid $R(COOH)_m$ and the proportion of oxyalkyl groups, relative to the weight of the overall molecule, is 75 to 96% and the molecular weight is 1,000 to 10,000.

4. The method of using compounds of the formula I, as claimed in claims 1 to 3, in which R is the radical of a $C_1$- to $C_4$-alkanecarboxylic or alkenecarboxylic acid $R(COOH)_m$ and m is the number 1 or 2 and the proportion of oxyalkyl groups, relative to the weight of the overall molecule, is 80 to 94% and the molecular weight is 2,500 to 5,000.

5. The method of using compounds of the formula I, as claimed in claims 1 to 4, in which R is methyl radical.

6. A preparation containing a dyestuff having a particle size of below about 5 μm and a compound of the formula I as used in claim 1.

7. A preparation as claimed in claim 6, containing a dyestuff having a particle size of below about 3 μm.

8. A preparation as claimed in claims 6 and 7, containing a disperse or vat dyestuff.

9. A preparation as claimed in claims 6 to 8, containing 5 to 90% by weight of a dyestuff, 2 to 30% by weight of a compound of the formula I, 0 to 20% by weight of anionic dispersing agents and 0 to 70% by weight of water and/or humectant, and, if desired, further auxiliaries.

10. A preparation as claimed in claims 6 to 9, containing 10 to 80% by weight of a dyestuff, 2 to 15% by weight of a compound of the formula I, 0 to 10% by weight of anionic dispersing agents and 0 to 70% by weight of water and/or humectant, and, if desired a further auxiliary.

* * * * *